(12) United States Patent
Krishna et al.

(10) Patent No.: US 9,877,196 B2
(45) Date of Patent: *Jan. 23, 2018

(54) USER AUTHENTICATION SYSTEMS AND METHODS

(71) Applicant: Verizon Patent and Licensing Inc., Arlington, VA (US)

(72) Inventors: Nyshadham Shiva Rama Krishna, Hyderabad (IN); Prateek Mehrotra, Hyderabad (IN); Vishal Bhasin, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/686,951

(22) Filed: Aug. 25, 2017

(65) Prior Publication Data

US 2017/0353858 A1 Dec. 7, 2017

Related U.S. Application Data

(63) Continuation of application No. 14/929,333, filed on Oct. 31, 2015, now Pat. No. 9,788,204.

(51) Int. Cl.
*H04W 12/06* (2009.01)
*H04W 12/08* (2009.01)
*H04M 1/725* (2006.01)
*G06F 21/31* (2013.01)
*H04M 1/67* (2006.01)

(52) U.S. Cl.
CPC ............ *H04W 12/06* (2013.01); *G06F 21/31* (2013.01); *H04M 1/72519* (2013.01); *H04M 1/67* (2013.01); *H04M 2250/52* (2013.01)

(58) Field of Classification Search
CPC .............................. H04W 12/06; H04W 12/08
See application file for complete search history.

(56) References Cited

U.S. PATENT DOCUMENTS

| 7,793,225 | B2 * | 9/2010 | Anzures | G06F 3/017 345/173 |
| 2014/0137234 | A1 * | 5/2014 | Chin | G06F 21/36 726/19 |
| 2015/0161459 | A1 * | 6/2015 | Boczek | G06K 9/00885 382/115 |

* cited by examiner

*Primary Examiner* — Daniel Lai
*Assistant Examiner* — Frank Donado

(57) ABSTRACT

An exemplary method includes a user authentication system detecting a touch input on a lock screen of a mobile device while the lock screen displays a notification of an incoming voice call, determining that the touch input satisfies an end-user-defined authentication key requirement that includes an end-user-defined setting specifying that a direction of a vector of the touch input across the lock screen will not be considered as part of the end-user-defined authentication key requirement, and facilitating, based on the determining that the touch input satisfies the end-user-defined authentication key requirement, a pick-up of the incoming voice call. Corresponding systems and methods are also described.

20 Claims, 11 Drawing Sheets

800

Authentication Key Options:

| | |
|---|---|
| Total Distance: | 43 |
| Tolerance for Total Distance: | +/-3 |
| Number of Vectors: | 1 |
| Tolerance for Angle Between Vectors: | +/-10° |
| Consider Direction of Vectors?: | X |
|     Tolerance for Direction of Vectors: | +/-10° |

Apply Authentication Key to:

| | |
|---|---|
| Incoming Call Lock Screen | X |
| Camera | X |
| Applications: | |
|     Application A | X |
|     Application B | X |
|     Application C | |
| Native Lock Screen | X |

USER AUTHENTICATION SYSTEMS AND METHODS

RELATED APPLICATIONS

This application is a continuation application of U.S. patent application Ser. No. 14/929,333, filed Oct. 31, 2015, and entitled "User Authentication Systems and Methods", which is hereby incorporated by reference in its entirety.

BACKGROUND INFORMATION

Mobile devices, such as mobile phones, have been equipped with features that prevent unauthorized individuals from using the mobile devices and/or that prevent unintentional use (e.g., a pocket call) of the mobile devices. For example, many mobile phones provide a phone lock feature. A user of a mobile phone having a phone lock feature may manually lock the mobile phone. While the mobile phone is locked, the mobile phone will not respond to certain user inputs such as those associated with placing a phone call. Typically, the user of the mobile phone must first provide specific user input to manually unlock the mobile phone before utilizing certain features of the mobile phone (e.g., before dialing to place a phone call).

To unlock the mobile phone, the user may traditionally enter a personal identification number ("PIN") and/or a password. However, typical phone lock features do not require the user to enter a PIN or a password when the mobile phone receives an incoming call. Consequently, any individual with access to the mobile phone is able to answer the incoming call even in circumstances where the mobile phone would otherwise be locked. This may be unacceptable in certain circumstances where an incoming call is intended only for a particular user, such as when the incoming call is personal and/or confidential in nature. In addition, entering a conventional PIN and/or password as an extra confirmation step may be inconvenient or annoying to some users and may introduce unnecessary delay to the answering of an incoming call.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 8 illustrates an exemplary graphical user interface view according to principles described herein.

DETAILED DESCRIPTION OF PREFERRED EMBODIMENTS

Figure 1:
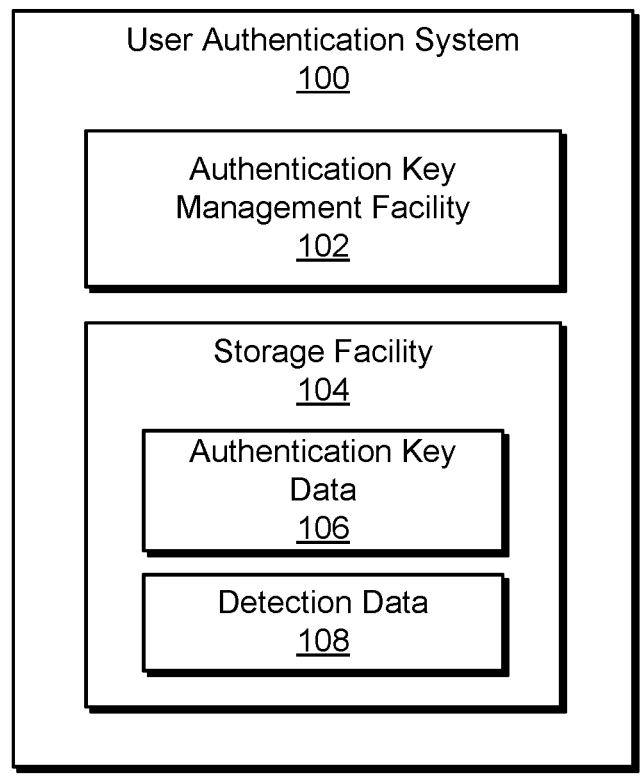
FIG. 1 illustrates an exemplary user authentication system according to principles described herein.

Exemplary user authentication systems and methods are described herein. Certain systems and methods described herein may facilitate a definition, by an end user of a mobile device, of an authentication key to be used in any suitable manner to authenticate the end user to the mobile device. After such an authentication key has been defined, certain systems and methods described herein may detect a user input (e.g., a touch input, a proximity input, a movement of the mobile device, etc.) that is provided by the end user by way of the mobile device. The systems and methods described herein may determine one or more attributes associated with the user input provided by the end user, determine, based on the one or more attributes, that the user input satisfies an end-user-defined authentication key requirement, and authorize, based on the user input satisfying the end-user-defined authentication key requirement, the end user to access one or more features of the mobile device.

In certain examples, the systems and methods described herein may facilitate an end-user definition of an authentication key to be used by the mobile device to authenticate the end user to answer an incoming voice call. After the authentication key has been defined, certain systems and methods described herein may detect a touch input on a lock screen of the mobile device while the lock screen displays a notification of an incoming voice call, determine that the touch input satisfies the end-user-defined authentication key (e.g., by determining that the touch input satisfies one or more end-user-defined authentication key requirements of the authentication key), and facilitate, based on the determining that the touch input satisfies the end-user-defined authentication key, a pick-up of the incoming voice call.

Examples of an end user defining an authentication key, end-user-defined authentication key requirements (e.g., a touch input distance requirement, a touch input direction component, a number of touch input vectors requirement, etc.) of an authentication key, and user inputs that satisfy end-user-defined authentication key requirements are described herein. Any suitable combination or sub-combination of the exemplary end-user-defined authentication key requirements described herein may be defined by an end user and used by a user authentication system to authenticate the end user and provide the authenticated end user with access to one or more features of the mobile device.

Various benefits may be realized in accordance with the systems and methods described herein. For example, exemplary systems and methods described herein may enable authentication of a user to a mobile device in a convenient, efficient, and secure manner. In addition, certain systems and methods described herein may effectively prevent unauthorized users from answering an incoming voice call to the mobile device and/or from otherwise gaining access to one or more features of the mobile device. Such benefits may enhance the security and/or convenience of the mobile device. These and/or additional or alternative benefits that may be provided by exemplary systems and methods described herein will be made apparent by the following description. Exemplary user authentication systems and methods will now be described in reference to the accompanying drawings.

FIG. 1 illustrates an exemplary user authentication system 100 ("system 100"). System 100 may perform one or more of the operations described herein to authenticate an end user to a mobile device. As shown in FIG. 1, system 100 may include, without limitation, an authentication key management facility 102 ("management facility 102") and a storage facility 104 selectively and communicatively coupled to one another. Facilities 102 and 104 may be communicatively coupled one to another by any suitable communication technologies.

It will be recognized that although facilities 102 and 104 are shown to be separate facilities in FIG. 1, the facilities 102 and 104 may be combined into a single facility or split into additional facilities as may serve a particular implementation. Additionally or alternatively, one or more of the facilities 102 and 104 may be omitted from and external to system 100 in other implementations. For example, storage facility 104 may be external of system 100 in some alternative implementations. Facilities 102 and 104 will now be described in more detail.

Storage facility 104 may store authentication key data 106 representative of information associated with an authentication key that may be defined by an end user of a mobile device and that may be used by system 100 to authenticate the end user to the mobile device. For example, authentication key data 106 may include data that defines directions and magnitudes of one or more vectors representative of an authentication key, and/or any other suitable information that may be used to define an authentication key. Examples of authentication keys that may be represented by authentication key data 106 are described herein. Storage facility 104 may also store detection data 108 representative of information associated with a detected attempt of an end user of a mobile device to enter an authentication key by way of user input (e.g., touch input). For example, detection data 108 may represent user input such as one or more touch gestures provided by the end user on a touch screen of the mobile device to unlock the mobile device from a locked state. Storage facility 104 may maintain additional or alternative data as may serve a particular implementation.

Management facility 102 may perform one or more operations associated with authenticating an end user of a mobile device to operate the mobile device. To that end, management facility 102 may facilitate the end user defining an authentication key that may be used to authenticate the end user. Management facility 102 may facilitate the end user defining the authentication key in any suitable manner. For example, management facility 102 may provide one or more graphical user interface settings screens for display on a touch screen of the mobile device and for use by the end user to define the authentication key. Exemplary graphical user interface settings screens that may be provided for display by management facility 102 are described herein.

An authentication key may be defined to include one or more authentication key requirements that are to be satisfied in order to authenticate an end user to the mobile device. In certain examples, the authentication key requirements may represent one or more end-user-defined user inputs that, when input by an end user of the mobile device, authorize the end user to access one or more features of the mobile device. The authentication key may be comprised of any suitable number and/or combination of user inputs. For example, the authentication key may comprise a series of consecutive touch inputs that may be entered by the end user on a touch screen of the mobile device. To illustrate, the authentication key may include a first touch input that starts at a first location on the touch screen of the mobile device and that ends at a second location on the touch screen (e.g., by the end user sliding a finger from the first location to the second location on the touch screen). The authentication key may also include a second touch input that continues from the second location on the touch screen to a third location on the touch screen (e.g., by the end user sliding a finger from the second location to the third location on the touch screen). Specific examples of authentication keys are provided herein.

In certain examples, the user inputs specified by the authentication key may be represented by one or more vectors that each have a magnitude and a direction. For example, the first touch input described above may be represented by a first vector that has a magnitude corresponding to a distance from the first location to the second location and that is directed in a first direction on the touch screen. The second touch input described above may be represented by a second vector that has a magnitude corresponding to a distance from the second location to the third location and that is directed in a second direction on the touch screen. In certain examples, the second direction of the second vector may be at an angle with respect to the first direction of the first vector. The authentication key may specify these and/or any other attributes of user inputs, including by specifying any suitable number of vectors and/or vector attributes to represent any suitable set of authentication key requirements as may suit a particular implementation.

After the authentication key has been defined, management facility 102 may use the authentication key to authenticate the end user to the mobile device. Management facility 102 may use the authentication key to authenticate the end user to the mobile device for any suitable purpose. For example, management facility 102 may use the authentication key to authenticate the end user to access one or more features of the mobile device. Such features may include, but are not limited to, screen unlock features, incoming call features, camera features, mobile application features, and/or any other feature that may be provided by way of the mobile device. Specific examples in which management facility 102 may use the authentication key to authenticate the end user are provided herein.

Management facility 102 may use the authentication key to authenticate the end user in any suitable manner. For example, management facility 102 may, prior to the end user accessing one or more features of the mobile device, detect a user input associated with the mobile device that is intended to represent the authentication key. The user input may include any suitable user input that may be provided by way of the mobile device. For example, the user input may include a touch input, a proximity input and/or any other suitable user input. Management facility 102 may detect the user input by utilizing any suitable sensing technology provided by way of the mobile device (e.g., touch sensing technologies, proximity sensing technologies, etc.).

After management facility 102 detects the user input, management facility 102 may determine one or more attributes associated with the user input. Such attributes may include, but are not limited to, attributes of one or more vectors that represent the user input (e.g., a number of vectors associated with the user input, distances associated with the vector(s) representing the user input, and/or a direction of the vector(s) associated with the user input). Management facility 102 may store the detected attributes as detection data 108.

Based on the attributes associated with the user input, management facility 102 may determine whether the user input satisfies an end-user-defined authentication key requirement specified by the authentication key. This may be performed in any suitable manner. For example, management facility 102 may compare the one or more attributes associated with the user input to one or more parameters of the end-user-defined authentication key requirement to determine whether the user input satisfies the end-user-defined authentication key requirement.

An end-user-defined authentication key requirement may specify any suitable end-user-defined parameter or combination of end-user-defined parameters that management facility 102 may consider when determining whether a user input qualifies as a satisfactory entry of an authentication key. For example, the end-user-defined authentication key requirement may specify one or more parameters such as, but not limited to, a distance threshold requirement, a direction requirement, a number of vectors requirement, an angle between vectors requirement, and/or any other suitable parameter. The end-user-defined authentication key requirement may also specify one or more tolerances for parameter matching, such as a distance tolerance, a direction tolerance, and a vector angle tolerance. The distance threshold requirement may correspond to any suitable end-user-defined distance threshold specified by an end-user-defined authentication key requirement, such as a distance threshold (e.g., a distance range) for one or more vectors that represent user input. The direction requirement may require that each vector representing a touch input is directed in the same direction, within a defined tolerance, as a corresponding vector representing the authentication key. The number of vectors requirement may require that there be an equivalent number of vectors representing the user input as there are representing the authentication key. The vector angle requirement may require that any consecutive vectors representing the user input have an angle between them that is within a predefined angle tolerance of an angle between corresponding consecutive vectors representing the authentication key. The end user of the mobile device may customize the tolerances and/or parameters of the end-user-defined authentication key requirement in any suitable manner. Specific examples of parameters and/or tolerances of an end-user-defined authentication key requirement are described herein.

Management facility 102 may determine that a given user input satisfies the end-user-defined authentication key requirement based on any one or a combination of the parameters and/or tolerances described herein. Examples of management facility 102 determining that user input satisfies specific parameters and/or tolerances of an end-user-defined authentication key requirement will now be described.

In certain examples, management facility 102 may determine that the user input satisfies the end-user-defined authentication key requirement based on a determination that a total distance associated with the user input falls within an end-user-defined tolerance of the distance threshold specified by the end-user-defined authentication key requirement. Management facility 102 may calculate the total distance in any suitable manner and using any suitable mathematical methods. For example, management facility 102 determine a magnitude of the one or more vectors representative of the user input. Management facility 102 may then add the magnitudes together to determine the total distance. Management facility 102 may determine that the total distance associated with the user input is less than or greater than a total distance associated with the authentication key. However, as long as the total distance (e.g., the sum of magnitudes of each of the vectors) of the user input falls within the end-user-defined tolerance of the distance threshold, management facility 102 may determine that the distance requirement is satisfied. Specific examples of end-user-defined tolerances for distance thresholds are provided herein.

Additionally or alternatively, management facility 102 may determine that a given user input satisfies the end-user-defined authentication key requirement based on a directional requirement for each of the one or more vectors that represent the authentication key. For example, a particular authentication key may be represented by a first vector, a second vector, and a third vector. The first vector may be directed upwards towards an upper right corner of the touch screen of the mobile device. The second vector may be directed downwards toward a lower left corner of the touch screen from the end point of the first vector. The third vector may be directed vertically upwards from the end point of the second vector. Management facility 102 may, as part of the end-user-defined authentication key requirement, verify, in any suitable manner, that the directions of vectors associated with a user input either match or are within a predefined threshold of the directions of the first, second, and third vectors specified by the authentication key. For example, management facility 102 may determine that the directional requirement is satisfied as long as the user input includes an equivalent number of vectors that are generally directed in the same direction as the vectors specified by the authentication key (e.g., a first vector directed generally upwards, a second vector directed generally downwards, and a third vector directed generally upwards).

Additionally or alternatively, management facility 102 may determine that a given user input satisfies the end-user-defined authentication key requirement based on whether the directions of the vectors that represent the authentication key and the directions of the corresponding vectors that represent the user input are within a direction tolerance of each other. Management facility 102 may calculate the differences in directions in any suitable manner and using any suitable mathematical methods. For example, management facility 102 may calculate an angle (e.g., an angle measured from a horizontal plane to the vector) of a vector representing a user input and compare that angle to an angle of a corresponding vector representing the authentication key. Management facility 102 may determine that the user input satisfies a direction tolerance of the end-user-defined authentication key requirement when the comparison indicates that the respective angles are within a predefined threshold of each other. Specific examples of how management facility 102 may calculate the directions of vectors representing user inputs and vectors representing authentication keys are provided herein.

Additionally or alternatively, management facility 102 may determine that a given user input satisfies the end-user-defined authentication key requirement based on whether angles between consecutive vectors that represent the authentication key and the corresponding consecutive vectors that represent the user input are within an angle tolerance of each other. For example, a user input may be represented by a first vector and a second vector that begins at the end point of the first vector. The angle between the first vector and the second vector may correspond to any angle that may be defined based on the respective directions associated with the first vector and the second vector. The angle between the first vector and the second vector may be compared to a corresponding angle between corresponding consecutive vectors to determine a difference between the angles. Management facility 102 may calculate the difference in angles in any suitable manner and using any suitable mathematical methods. For example, management facility 102 may calculate an angle between the first vector and the second vector representing the user input and compare that angle to an angle between corresponding vectors representing the authentication key. Management facility 102 may determine that the user input satisfies an angle-between-vectors tolerance of the end-user-defined authentication key requirement when the comparison indicates that the respective angles are within a predefined threshold of each other. Specific examples of how management facility 102 may calculate angles between consecutive vectors representing user inputs and consecutive angles between vectors representing authentication keys are provided herein.

In certain examples, management facility 102 may determine that the user input satisfies the end-user-defined authentication key requirement irrespective of a direction of the vector that is representative of the user input. That is, in certain examples, management facility 102 may determine that a user input satisfies the end-user-defined authentication key requirement based solely on the determined total distance of user input (e.g., the total distance of movement of one or more touch inputs across the touch screen of the mobile device). To illustrate, an authentication key may be represented by a first vector directed in a first direction and a second vector directed in a second direction. A user input entered by the end user may be represented by a third vector and a fourth vector that are directed in a third direction and a fourth direction, respectively. The first direction and the second direction may be different from the third direction and the fourth direction. However, when the end-user-defined authentication key requirement does not include a directional requirement, management facility 102 may determine that the user input satisfies an end-user-defined authentication key requirement regardless of the directions associated with the third direction and the fourth direction.

Based on a determination that user input satisfies an end-user-defined authentication key requirement, management facility 102 may facilitate access to one or more features of the mobile device. This may be accomplished in any suitable manner. For example, management facility 102 may, after determining that the user input satisfies the end-user-defined authentication key requirement, direct the mobile device, in any suitable manner, to allow access to the one or more features of the mobile device. Specific examples of how management facility 102 may facilitate access to one or more features of the mobile device are provided herein.

In certain examples, management facility 102 may use the authentication key to authenticate the end user to answer an incoming voice call. To that end, management facility 102 may detect a touch input on a lock screen of the mobile device while the lock screen displays a notification of the incoming voice call. Management facility 102 may detect the touch input in any suitable manner. For example, management facility 102 may, through any suitable touch sensing technology of the mobile device, detect a touch input as the end user slides, for example, a finger across a touch screen of the mobile device.

The lock screen may comprise any screen view that is displayed on a touch screen of a mobile device during a lock state of the mobile device and/or that provides a mechanism for use by an end user to unlock the mobile device from the lock state. The lock screen may be a native lock screen or a non-native lock screen. As used herein, a "native lock screen" may refer to a standard lock screen (i.e., a default lock screen) of a mobile device, such as a lock screen that is provided by an operating system and/or firmware of the mobile device. A "non-native lock screen" may refer to any other type of lock screen that may be provided in addition to, or in replacement of, a native lock screen, such as a lock screen that is provided by an after-market application installed and running on the mobile device. In certain examples, a native lock screen and/or a non-native lock screen may include one or more graphical options that may be selected by the end user to access one or more features of the mobile device. Specific examples of lock screens and how they may be utilized to facilitate entry of an authentication key are provided herein.

After management facility 102 detects the touch input, management facility 102 may determine a total distance of movement of the touch input across the lock screen. This may be accomplished in any suitable manner. For example, management facility 102 may determine the total distance based on one or more attributes of a vector that is representative of the touch input. The vector may define a magnitude and a direction of the touch input. As mentioned, the distance associated with the vector may comprise any suitable distance that may be determined by management facility 102. In certain examples, the distance may correspond to a magnitude of the vector.

In certain examples, a touch input may be represented by a plurality of vectors. In such examples, management facility 102 may determine the total distance by summing a plurality of distances associated with the plurality of vectors that are representative of the touch input. To illustrate, management facility 102 may detect that a touch input is represented by a first vector, a second vector, and a third vector. Management facility 102 may calculate, in any suitable manner, a first magnitude (i.e., distance) of the first vector, a second magnitude of the second vector, and a third magnitude of the third vector. Management facility 102 may then determine the total distance of the movement of the touch input across the lock screen by adding the first, second, and third magnitudes together.

Based on the determined total distance, management facility 102 may determine that the touch input satisfies an end-user-defined authentication key requirement. This may be accomplished in any suitable manner. For example, management facility 102 may compare the determined total distance with a total distance and/or distance threshold requirement specified by the end-user-defined authentication key requirement. If the total distance equals the distance threshold requirement or falls within the range specified by the distance threshold requirement, management facility 102 may determine that the touch input satisfies the end-user-defined authentication key requirement.

Based on management facility 102 determining that the touch input satisfies the end-user-defined authentication key requirement, management facility 102 may facilitate pick-up of the incoming voice call. Management facility 102 may facilitate pick-up of the incoming voice call in any suitable manner. For example, management facility 102 may facilitate pick-up of the incoming voice call by directing the mobile device to transition from a locked state to an unlocked state and to connect to the incoming voice call. In certain examples, management facility 102 may direct the mobile device to connect to the incoming voice call upon release of a valid touch input (e.g., when the end user lifts a finger associated with the touch input off of the touch screen) from the lock screen of the mobile device. Alternatively, management facility 102 may direct the mobile device to connect to the incoming voice call upon receipt of another user input associated with the touch screen (e.g., an additional user input associated with a call pick-up graphical object provided for display on the touch screen). Management facility 102 may facilitate pick-up of the incoming voice call in any other suitable manner in other implementations.

Figure 2:
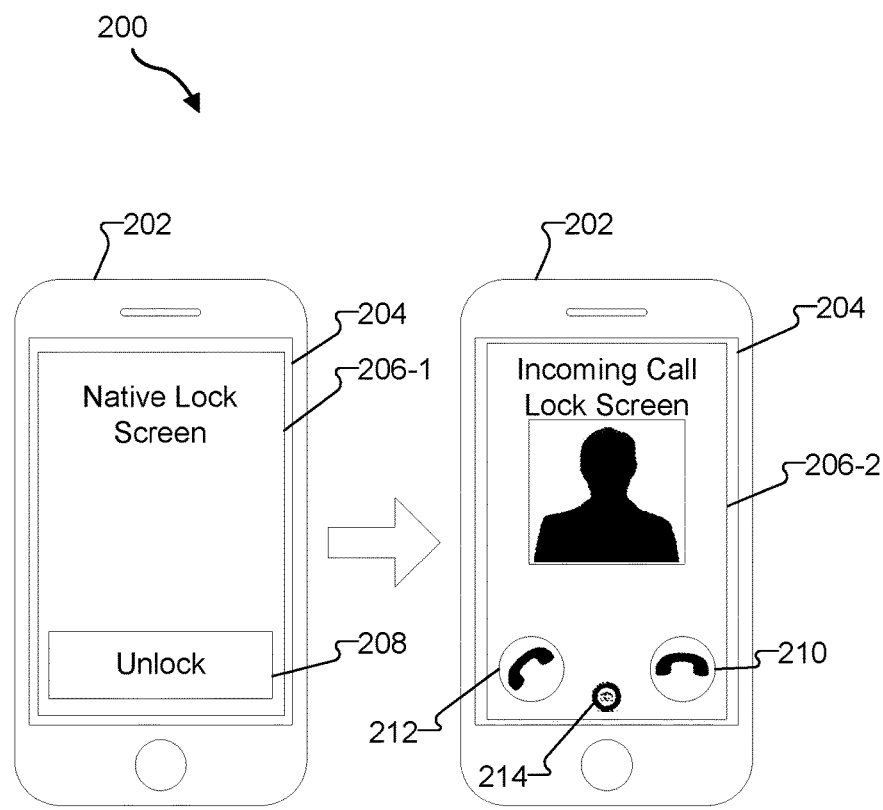
FIGS. 2-4 illustrate exemplary implementations of the user authentication system of FIG. 1 according to principles described herein.

FIG. 2 illustrates an exemplary implementation 200 showing a series of graphical user interface screens that may be provided for display by way of a mobile device 202. As used herein, a "mobile device" may include any suitable computing device configured to detect a user input representative of an authentication key, such as a computing device having a touch screen on which touch input may be provided by an end user. For example, a mobile device may include, but is not limited to, a mobile phone, a smartphone, a tablet computer, a laptop computer, and/or any other mobile device as may serve a particular implementation.

As shown in FIG. 2, mobile device 202 may initially be in a locked state. While in the locked state, a touch screen 204 of mobile device 202 may display any suitable lock screen 206 (e.g., lock screens 206-1 and 206-2). In the example shown in FIG. 2, touch screen 204 may initially display a native lock screen 206-1 that provides an end user of mobile device 202 with a mechanism to unlock mobile device 202. For example, the end user may provide any suitable user input associated with an "unlock" graphical object 208 to access certain features provided by mobile device 202. Such a user input may include the end user, for example, sliding a finger from left to right across unlock graphical object 208 in a manner specified by a manufacturer of mobile device 202.

While mobile device 202 is in the locked state, mobile device 202 may receive an incoming voice call. In response to the incoming voice call, incoming call lock screen 206-2 may be displayed on touch screen 204 (e.g., by transitioning from native lock screen 206-1 to an incoming call lock screen 206-2). Incoming call lock screen 206-2 may be a native or non-native lock screen. Incoming call lock screen 206-2 may include any suitable information associated with the incoming voice call (e.g., an identification of a phone number associated with the incoming voice call, an image of the person calling, etc.). Incoming call lock screen 206-2 may also include various graphical objects that facilitate and end user accepting or declining the incoming voice call. In the example shown in FIG. 2, incoming call lock screen 206-2 includes a call decline graphical object 210, a call pick-up graphical object 212, and a camera graphical object 214. To decline the incoming call, the end user may perform any suitable user input associated with call decline graphical object 210. If the end user declines the incoming call, touch screen 204 may continue to display incoming call lock screen 206-2, transition back to native lock screen 206-1, display other display content, or stop displaying content (e.g., by transitioning into a sleep mode).

To accept the incoming voice call, the end user may provide any suitable user input or combination of user inputs representative of an authentication key on touch screen 204. For example, the end user may provide user input representative of an authentication key in any suitable area on touch screen 204. Alternatively, the end user may provide any suitable user input associated with call pick-up graphical object 212 and then provide additional user input representative of an authentication key to accept the incoming voice call and authenticate to mobile device 202. Alternatively, the end user may provide the authentication key in any suitable area of touch screen 204 to authenticate to mobile device 202 and then, for example, touch call pick-up graphical object 212 to accept the incoming voice call. In certain examples, a notification (not shown) may be provided together with incoming call lock screen 206-2 prompting the user to enter the authentication key.

Figure 3:
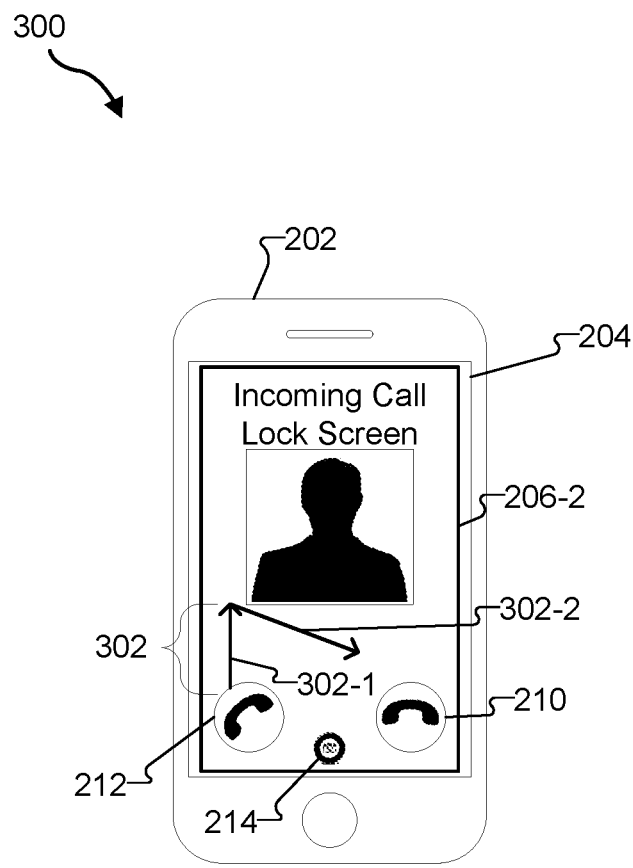

FIG. 3 illustrates an implementation 300 that shows an exemplary touch input 302 that may be entered by an end user to authenticate to mobile device 202 and authorize acceptance of the incoming voice call. In the example shown in FIG. 3, touch input 302 comprises a first touch input 302-1 and a second touch input 302-2 that may be consecutively provided by the end user of mobile device 202. For example, the end user may touch a finger to call pick-up graphical object 212 and move the finger upwards across touch screen 204 to enter touch input 302-1. At the end of touch input 302-1, and while continuously touching touch screen 204, the end user may change direction and move the finger to the right and downward across touch screen 204 to enter touch input 302-2.

Management facility 102 may determine whether touch input 302 satisfies one or more parameters specified by an end-user-defined authentication key requirement. For example, management facility 102 may verify that the direction of touch inputs 302-1 and 302-2 match, within a defined tolerance, directions of corresponding vectors specified by an authentication key defined by the end user. In addition, management facility 102 may determine that an angle between touch inputs 302-1 and 302-2 is within a predefined threshold of an angle between corresponding vectors representative of the authentication key. Further, management facility 102 may sum the distances associated with touch inputs 302-1 and 302-2 and determine that touch input 302 satisfies a distance requirement of the end-user-defined authentication key requirement if the sum of the distances falls within a predefined threshold of a total distance specified by the authentication key. Management facility 102 may determine that touch input 302 satisfies the end-user-defined authentication key requirement based on any one or a combination of the parameters specified by the authentication key.

After management facility 102 determines that touch input 302 satisfies the end-user-defined authentication key requirement, management facility 102 may facilitate a pick-up of the incoming voice call. For example, management facility 102 may direct mobile device 202 to connect to the incoming voice call upon satisfaction of the end-user-defined authentication key requirement and when the end user lifts a finger off of the screen at the end of the arrow representing touch input 302-2. Alternatively, management facility 102 may direct mobile device 202 to connect to the incoming voice call upon satisfaction of the end-user-defined authentication key requirement and upon the end user entering an additional user input associated with call pick-up graphical object 212.

Although the example illustrated in FIG. 3 shows touch input 302 originating from call pick-up graphical object 212, it is understood that touch input 302 may be provided in and/or originate from any suitable portion of touch screen 204 and still qualify as a valid touch input as long as the end-user-defined authentication key requirement is satisfied. In alternative examples, the authentication key may require, as an additional authentication parameter, that touch input 302 begin at call pick-up graphical object 212.

In certain examples, management facility 102 may use an authentication key to authenticate the end user to decline an incoming voice call. In such examples, to decline the incoming voice call, the end user may provide any suitable user input or combination of user inputs representative of an authentication key on touch screen 204. For example, the end user may provide user input representative of an authentication key in any suitable area on touch screen 204. Alternatively, the end user may provide any suitable user input associated with call decline graphical object 210 and then provide additional user input representative of an authentication key to decline the incoming voice call and authenticate to mobile device 202. Alternatively, the end user may provide the authentication key in any suitable area of touch screen 204 to authenticate to mobile device 202 and then, for example, touch call decline graphical object 210 to decline the incoming voice call. The authentication key that may be used to decline an incoming voice call may be the same authentication key that may be used to accept the incoming voice call. Alternatively, the authentication key used to decline the incoming voice call may be specific to a decline incoming voice call operation and different from an authentication key used to accept the incoming call.

Figure 4:
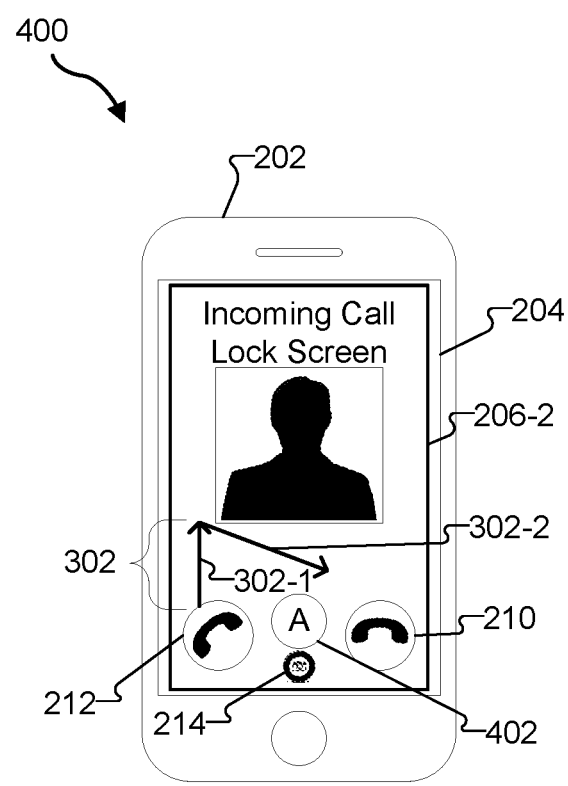

In certain examples, management facility 102 may provide, for display, a distance indicator that indicates, in real time, a current distance of movement as the touch input moves across the lock screen. Management facility 102 may provide the distance indicator for display in any suitable manner. For example, FIG. 4 shows an exemplary implementation 400 in which a distance indicator 402 is provided for display together with call decline graphical object 210 and call pick-up graphical object 212 in incoming call lock screen 206-2. While the end-user moves, for example, a finger across touch screen 204 to enter touch input 302, distance indicator 402 may continuously update and indicate, in real time, a current total distance associated with touch input 302. This may help the end user of mobile device 202 to readily ascertain when the total distance associated with touch input 302 either matches or falls within a predetermined threshold of a total distance specified by the authentication key. FIG. 4 shows a generic indicator "A" for the total distance. However, the total distance may be represented by any suitable numeric value and in any suitable units (e.g., inches, centimeters, millimeters, pixels, etc.).

Figure 5:
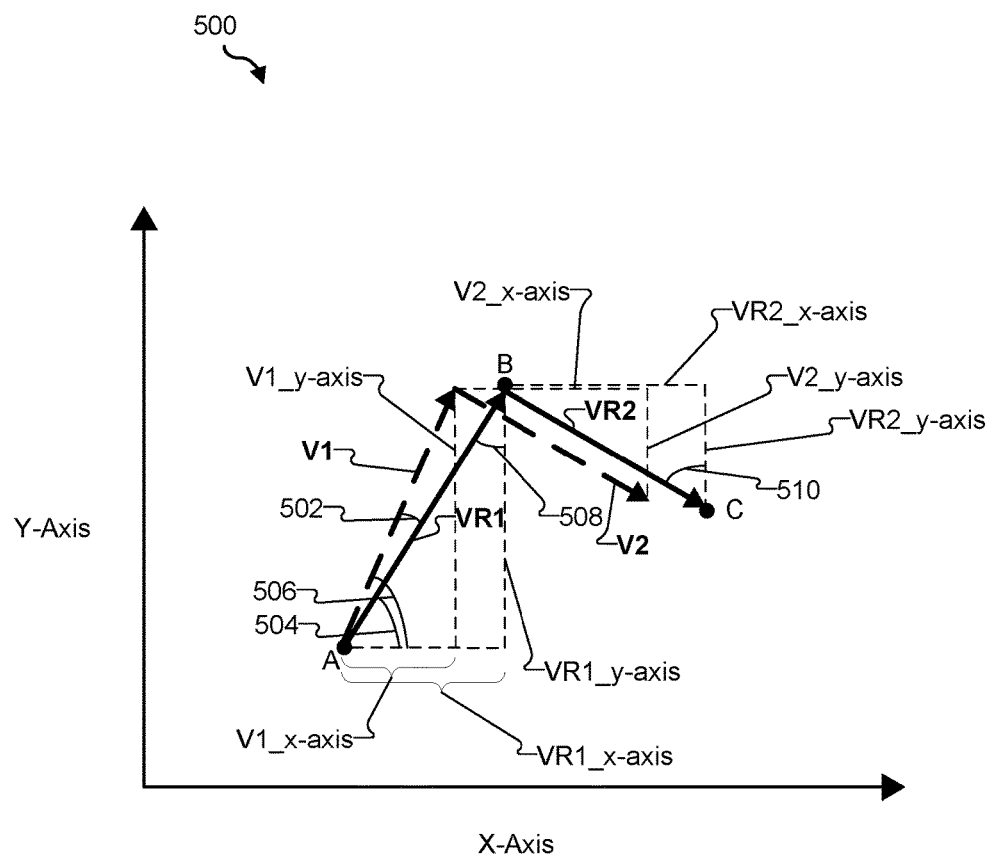
FIGS. 5-6 illustrate exemplary authentication keys and touch inputs according to principles described herein.

Management facility 102 may utilize any suitable algorithm or method to calculate distances, directions, and/or angles associated with vectors representative of touch inputs and/or authentication keys. To illustrate, FIG. 5 shows an exemplary graph 500 that includes an exemplary authentication key represented by vector VR1 and vector VR2 and an exemplary touch input represented by vector V1 and vector V2. The following description sets forth exemplary equations that may be utilized by management facility 102 to determine whether the touch input satisfies an end-user-defined authentication key requirement associated with the authentication key. In the example shown in FIG. 5, vector VR1 begins at point A and ends at point B, and vector VR2 begins at point B and ends at point C. Together vector VR1 and vector VR2 represent an authentication key that has been defined by an end user of mobile device 202. The coordinates for points A, B, and C may be specified as follows: A=(x1, y1); B=(x2, y2); and C=(x3, y3). Accordingly, vectors VR1 and VR2 may be identified in the following manner: VR1=[(x2−x1)x, (y2−y1)y] and VR2=[(x3−x2)x, (y3−y2)y].

Management facility 102 may determine a total distance associated with vectors VR1 and VR2 by determining a magnitude of each of those vectors and then summing the magnitudes. To illustrate, Pythagoras' theorem may be used to determine the magnitudes of vectors VR1 and VR2, which results in the following equations: $|VR1|=\sqrt{((x2-x1))^2+((y2-y1))^2}$; and $|VR2|=\sqrt{((x3-x2))^2+((y3-y2))^2}$. Management facility 102 may then determine the total distance associated with vectors VR1 and VR2 through the following equation: total distance=|VR1|+|VR2|.

In the example shown in FIG. 5, vectors V1 and V2 together may represent a touch input entered by an end user and intended to correspond to the authentication key represented by vectors VR1 and VR2. The magnitudes of vectors V1 and V2 may be determined in a manner similar to that described above with respect to vectors VR1 and VR2. As shown in FIG. 5, the magnitudes of vectors V1 and V2 deviate slightly from the magnitudes of vectors VR1 and VR2. Despite this deviation, management facility 102 may determine that the touch input associated with vectors V1 and V2 is sufficient to, for example, unlock mobile device 202 as long as the touch input satisfies one or more parameters specified in an end-user-defined authentication key requirement.

To illustrate, in the example shown in FIG. 5, management facility 102 may determine that the touch input associated with vectors V1 and V2 satisfies the end-user-defined authentication key requirement as long as |V1|+|V2| is either equal to or within a predefined threshold of |VR1|+|VR2|. In this regard, in certain examples, management facility 102 may determine that the touch input satisfies the end-user-defined authentication key requirement irrespective of a direction of vectors V1 and V2.

As described above, the end-user-defined authentication key requirement may additionally include a directional requirement that specifies that each of the vectors of the touch input must also be directed in at least the same general direction as corresponding vectors in the authentication key. Management facility 102 may confirm that the directional requirement is satisfied in any suitable manner. For example, management facility 102 may determine whether the sign (i.e., plus or minus) of each of the components of the vectors that make up the touch input match the signs of the components of the corresponding vectors in the authentication key. To illustrate, VR1_x-axis and VR1_y-axis shown in FIG. 5 represent the x-axis and y-axis components of vector VR1, and VR2_x-axis and VR2_y-axis represent the x-axis and y-axis components of vector VR2. In addition, V1_x-axis and V1_y-axis shown in FIG. 5 represent the x-axis and y-axis components of vector V1, and V2_x-axis and V2_y-axis represent the x-axis and y-axis components of vector V2. As shown in FIG. 5, the signs of both VR1_x-axis and VR1_y-axis are positive because VR1 x-axis is directed forward along the x-axis and VR1_y-axis is directed upward along y-axis. The sign of VR2_x-axis is positive and the sign of VR2_y-axis is negative because VR2_x-axis is directed forward along the x-axis and VR2_y-axis is directed downward along the y-axis. In examples where the end-user-defined authentication key requirement includes a directional requirement, management facility 102 may determine that the directional requirement is satisfied when the respective signs of the x-axis and y-axis components for vector V1 and vector V2 match the signs of the x-axis and y-axis components of vector VR1 and vector VR2 (e.g., in the example shown in FIG. 5, the signs of the V1_x-axis and V1_y-axis would have to both be positive and the sign for V2_x-axis would be positive and the sign for V2_y-axis would be negative).

As shown in FIG. 5, the direction of vector V1 deviates from the direction of vector VR1 by an angle 502. In examples where the end-user-defined authentication key requirement includes a tolerance for direction of vectors requirement, management facility 102 may determine whether a deviation between an angle of a vector representing a touch input is within a specified range of an angle of a vector representing an authentication key. As long as the deviation is within the specified range, V1 may still qualify as a valid touch input. Management facility 102 may calculate the deviation in any suitable manner. For example, management facility 102 may calculate an angle from horizontal (e.g., from the x-axis component) for each of vectors V1 and VR1. Management facility 102 may then subtract the angle associated with vector V1 by the angle associated with vector VR1. To illustrate, angle 504 represents a direction from horizontal of vector VR1 and angle 506 represents a direction from horizontal of vector V1. Angle 504 and angle 506 may be calculated through the following equations: angle $504=\tan^{-1}(VR1\_y\text{-axis}/VR1\_x\text{-axis})$; and angle $506=\tan^{-1}(V1\_y\text{-axis}/V1\_x\text{-axis})$. Management facility 102 may then determine angle 502 by subtracting angle 504 from angle 506. If the angle tolerance requirement is, for example, +/−30°, the direction tolerance requirement may be satisfied as long as angle 502 is within 30° of angle 504. Management facility 102 may calculate the angles associated with vectors V2 and VR2 in a similar manner.

As shown in FIG. 5, the angle between vector V1 and vector V2 is slightly different than the angle between vector VR1 and vector VR2. In examples where the end-user-defined authentication key requirement includes an angle tolerance requirement, management facility 102 may determine whether an angle between consecutive vectors representing a touch input is within a specified range of an angle between consecutive vectors representing an authentication key. As long as the deviation is within the specified range, V1 and V2 may still qualify as a valid touch input. Management facility 102 may calculate the deviation in any suitable manner. For example, management facility 102 may calculate an angle from vertical (e.g., from the y-axis component) for each of vectors V1 and V2. Management facility 102 may then add those angles together to determine the angle between vectors V1 and V2. Similarly, management facility 102 may calculate an angle from vertical for each of vectors VR1 and VR2. Management facility 102 may then add those angles together to determine the angle between vectors VR1 and VR2. To illustrate, angle 508 represents an angle from vertical of vector VR1 and angle 510 represents an angle from vertical of vector VR2. Angle 508 and angle 510 may be calculated through the following equations: angle $508=\tan^{-1}(VR1\_x\text{-axis}/VR1\_y\text{-axis})$; and angle $510=\tan^{-1}(VR2\_x\text{-axis}/VR2\_y\text{-axis})$. Management facility 102 may then determine the angle between vectors VR1 and VR2 by adding angle 508 to angle 510. Management facility 102 may determine the angle between vectors V1 and V2 in a similar manner. If the angle-between-vectors tolerance requirement is, for example, +/−30°, the angle tolerance requirement may be satisfied as long as the sum of angles 508 and 510 is within +/−30° of an angle between vectors V1 and V2.

Additionally or alternatively, management facility 102 may use the dot product of vectors to determine whether an angle between consecutive vectors representing a touch input is within a specified range of an angle between consecutive vectors representing an authentication key. To illustrate, the dot product of vectors V1 and V2 may be calculated through the following equation: $V1 \cdot V2 = |VR1||VR2|\cos(\theta)$, where $\theta$ is the angle between vectors V1 and V2. Therefore, the angle between vectors V1 and V2 may be calculated through the following equation: $\cos(\theta) = (Re(V1 \cdot V2))/(|VR1||VR2|)$. In a similar manner, management facility 102 may calculate the angle between vectors VR1 and VR2. Management facility 102 may compare the angle between vectors V1 and V2 to the angle between vectors VR1 and VR2 to determine whether the angle tolerance requirement is satisfied.

Although vectors V1 and VR1 are shown in FIG. 5 as each starting from point A, it is understood that in certain examples a touch input may start at a location that is offset in any direction and/or by any distance from point A and still qualify as a valid touch input as long as the parameters included in the end-user-defined authentication key requirement are satisfied.

Figure 6:
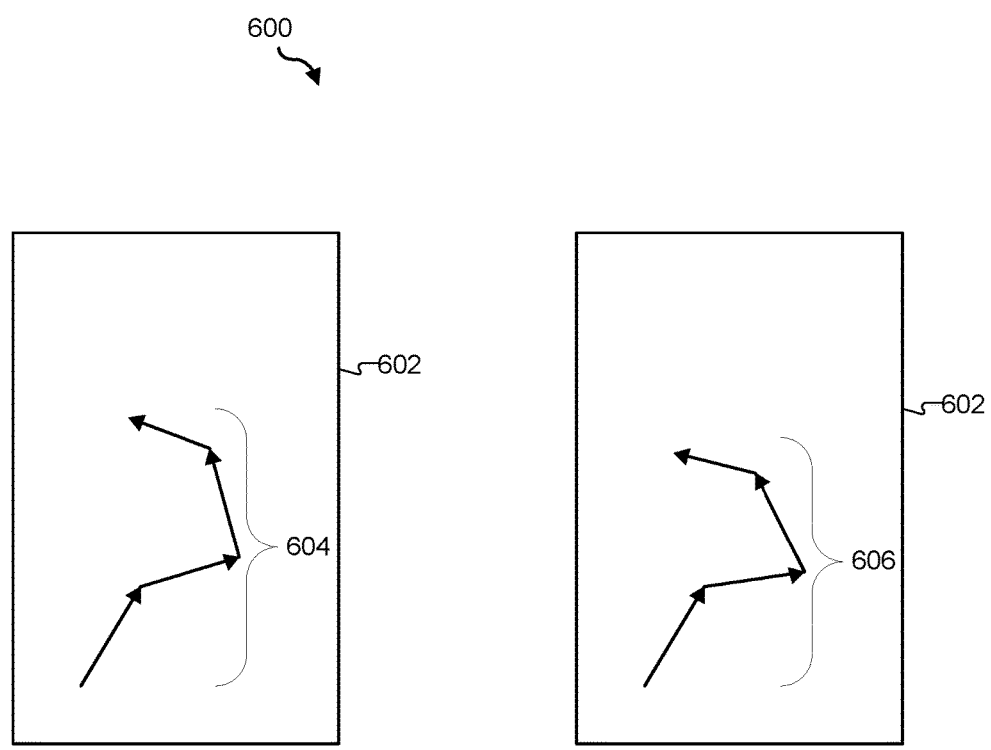

FIG. 6 illustrates an exemplary implementation 600 in which a touch screen 602 displays an exemplary authentication key 604 and an exemplary touch input 606. As shown in FIG. 6, authentication key 604 is represented by four vectors that are each provided in a particular direction on touch screen 602. Touch input 606 is also represented by four vectors that have directions that deviate from those of the corresponding vectors representative of authentication key 604. Despite this deviation, touch input 606 may qualify as a valid touch input as long as the four vectors representative of touch input 606 satisfy one or more parameters of an end-user-defined authentication key requirement associated with authentication key 604. Such tolerance may be defined to produce an appropriate level of convenience and/or difficulty for an end user providing touch input to authenticate to a mobile device. For example, a tolerance level may be defined to be relatively small to provide more security and less convenience, or a tolerance level may be defined to be relatively large to provide more convenience and less security.

Figure 7:
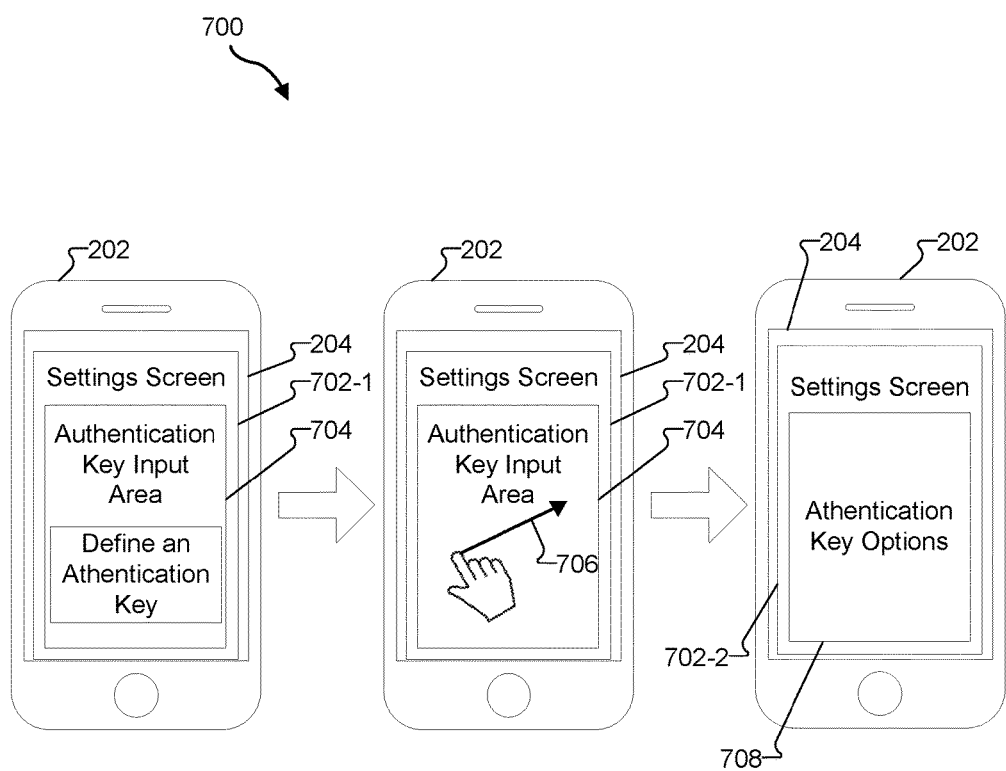
FIG. 7 illustrates exemplary graphical user interfaces that facilitate a user defining an authentication key according to principles described herein.

In certain examples, management facility 102 may provide, for display on touch screen 204 of mobile device 202, a graphical user interface settings screen that prompts and/or facilitates an end user of mobile device 202 to define (e.g., create) an authentication key. This may be accomplished in any suitable manner. For example, management facility 102 may provide, for display on touch screen 204, one or more graphical user interfaces to help an end user of mobile device 202 define an authentication key. To illustrate, FIG. 7 shows an implementation 700 in which a series of graphical user interface settings screens 702 (e.g., settings screens 702-1 through 702-2) may be provided for display on touch screen 204 of mobile device 202. The end user of mobile device 202 may interact with the settings screens 702 to define an authentication key. For instance, management facility 102 may provide setting screen 702-1 for display on touch screen 204 (e.g., in response to a selection of a menu option associated with definition of an authentication key). As shown in FIG. 7, settings screen 702-1 includes an authentication key input area 704 where the end user may provide one or more touch inputs to define the authentication key.

In certain examples, management facility 102 may prompt the end user to begin defining an authentication key in authentication key input area 704. Management facility 102 may prompt the end user to begin defining the authentication key in any suitable manner. For example, management facility 102 may provide a text notification, as illustrated in the example shown in FIG. 7. Additionally or alternatively, management facility 102 may direct mobile device 202 provide an audio command to prompt the end user to define the authentication key.

After management facility 102 prompts the end user to define the authentication key, management facility 102 may detect an authentication-key-defining touch input across settings screen 702-1 in authentication key input area 704. As described herein, the authentication-key-defining touch input may comprise a series of touch inputs that together define the authentication key. In the example shown in FIG. 7, an authentication-key-defining touch input 706 is provided by the end user across authentication key input area 704. Management facility 102 may analyze authentication-key-defining touch input 706 and determine one or more attributes associated with authentication-key-defining touch input 706. For example, based on authentication-key-defining touch input 706, management facility 102 may determine, in any suitable manner such as described herein, a total distance of movement of authentication-key-defining touch input 706 across settings screen 702-1. Management facility 102 may determine any other suitable attribute associated with authentication-key-defining touch 706 as may suit a particular implementation.

Based on the total distance of movement of authentication-key-defining touch input 706, management facility 102 may define an authentication key associated with authentication-key-defining touch input 706. In the example illustrated in FIG. 7, the authentication key associated with authentication-key-defining touch input 706 may be defined by management facility 102 as being represented by a single vector having a determined magnitude and direction on settings screen 702-1. Management facility 102 may utilize any other suitable parameter and/or information to define the authentication key.

The exemplary authentication key illustrated in FIG. 7 is provided for illustrative purposes only. It is understood that management facility 102 may facilitate the end user defining any suitable authentication key as may suit a particular implementation. Such an authentication key may include, for example, a single straight section, such as illustrated in FIG. 7, which may be represented by a single vector, or a plurality of straight sections that may each be represented by different single vectors. Additionally or alternatively, an authentication key may include a curved section (e.g., an arched section, a circular section, a figure-eight-shaped section, etc.) that requires the end user to provide, for example, a curved touch input across the touch screen to authenticate the end user to the mobile device. Management facility 102 may determine a total distance associated with a curved section of an authentication key in any suitable manner. For example, a curvature of a curved section of the authentication key may be represented by a plurality of consecutive vectors. Management facility 102 may determine a magnitude of each of a plurality of consecutive vectors in any suitable manner, such as described herein, and sum the magnitudes together to determine a total distance associated with the curved section.

In certain examples, management facility 102 may provide one or more graphical user interfaces that allow the end user of mobile device 202 to enter and/or customize one or more parameters of an end-user-defined authentication key requirement. For example, after management facility 102 determines one or more attributes associated with the authentication key, management facility 102 may provide, for display on touch screen 204, settings screen 702-2, which provides one or more authentication key options 708 that the end user may select to customize the end-user-defined authentication key requirement. Settings screen 702-2 may include any suitable option to customize the end-user-defined authentication key requirement.

To illustrate, FIG. 8 shows an exemplary implementation 800 of settings screen 702-2. As shown in FIG. 8, settings screen 702-2 may include a plurality of authentication key options and entry fields that may be used by the end user to customize one or more parameters of an authentication key. In the example illustrated in FIG. 8, such entry fields include a "Total Distance" entry field, a "Tolerance for Total Distance" entry field, a "Number of Vectors" entry field, a "Tolerance for Angle Between Vectors" entry field, a "Consider Direction of Vectors?" entry field, and a "Tolerance for Direction of Vectors" entry field. Settings screen 702-2 may include other options and/or parameters that may be customizable by the end user in other implementations.

In certain examples, management facility 102 may pre-populate certain authentication key options in settings screen 702-2 automatically based on the authentication key defined by the end user. For example, management facility 102 may determine that the total distance associated with authentication-key-defining touch 706 is 43 millimeters and pre-populate that value in the "Total Distance" field of settings screen 702-2. In addition, management facility 102 may determine that authentication-key-defining touch 706 is represented by one vector and pre-populate the "Number of Vectors" field with the number "1".

In certain examples, management facility 102 may pre-populate one or more of the other fields in the authentication key options with default settings, which can then be changed by the end user. For example, management facility 102 may pre-populate the "Tolerance for Total Distance" entry field, the "Tolerance for Direction of Vectors" entry field, and the "Tolerance for Angle Between Vectors" entry field with default settings.

The end user may modify any of the values in the authentication key option fields to customize an end-user-defined authentication key requirement. For example, the end user may enter "+/−3" in the "Tolerance for Total Distance" field such that any determined total distance in the range of 40-46 millimeters would satisfy the total distance requirement of the end-user-defined authentication key requirement. In addition, the end user may specify "+/−10°" in the "Tolerance for Direction of Vectors" field to define how much a direction of a vector representing a touch input may deviate from a vector that represents the authentication key. The end user may also modify the value in the "Number of Vectors" field. However, manually increasing, for example, the number of vectors from one to two may include management facility 102 prompting the end user to specify another vector in authentication key input area 704 (e.g., by entering another touch input starting from the end of the arrow representing authentication key 706).

The settings options illustrated in FIG. 8 are illustrative only. Other examples of settings screens may include one or more additional settings options, omit one or more of the settings options, and/or include any other combination or sub-combination of settings options as may suit a particular implementation.

In certain examples, management facility 102 may provide, for display on touch screen 204 of mobile device 202, a graphical user interface settings screen that provides a preview of a lock state screen. Such a settings screen may display a preview of a lock state screen and/or provide one or more settings tools that may be used by a user to position one or more objects of a lock state screen. For examples, a settings screen may include one or more tools that allow the user to position objects 210, 212, 214 at desired locations within the lock state screen. Such tools may allow the user to position objects 210, 212, and 214 in a manner that facilitates definition and use of a desired authentication key, such as by ensuring that certain authentication vectors may be obtained.

Although certain examples described herein are directed to user authentication in the context of authorizing pick-up of an incoming voice call, it is understood that the user authentication systems and methods described herein may be applied in any other suitable context where it may be desirable to authenticate an end user of a mobile device (e.g., mobile device 202). For example, based on a determination that a touch input satisfies an end-user-defined authentication key requirement, management facility 102 may facilitate access to one or more additional or alternative features of the mobile device. Management facility 102 may detect an authentication key and facilitate access to any suitable features that may be provided by way of the mobile device. Such features may include, for example, mobile applications operating by way of the mobile device, certain features provided by the mobile applications, features of the mobile device itself, and/or any other suitable feature.

In certain examples, management facility 102 may facilitate access to one or more features of the mobile device by authorizing access to a feature represented by a graphical option displayed on a lock screen (e.g., a native lock screen and/or a non-native lock screen) of the mobile device. For example, a lock screen (e.g., incoming call lock screen 206-2) of the mobile device may include a camera icon (e.g., camera graphical object 214) that may be selected by the end user to access and/or operate a camera of the mobile device. The end user may enter any suitable user input associated with the camera icon and then may be prompted, in any suitable manner, by management facility 102 to enter an authentication key to authenticate the end user to access and/or operate the camera. Alternatively, the end user may enter touch input relative to the graphical object representing the camera in the lock screen (e.g., starting on the graphical object) and that satisfies the authentication key to gain authorization to access and/or operate the camera.

In certain examples, management facility 102 may facilitate access to the one or more features of the mobile device by authorizing a submission of a payment through a mobile application operating by way of the mobile device. For example, such a mobile application may include a mobile gaming application that includes "in app" purchases. To prevent unwanted and/or unauthorized "in app" purchases, the end user may select (e.g., by way of settings screen 702-2) an option that requires entry of the authentication key to authorize any "in app" purchases provided by way of the mobile gaming application. With such an option selected, management facility 102 may prompt the end user to enter the authentication key each time an "in app" purchase is offered to the end user by way of the mobile gaming application.

In certain examples, management facility 102 may facilitate access to the one or more features of the mobile device by authorizing a login to a mobile application. For example, the one or more mobile applications operating by way of the mobile device may include a mobile banking application. To prevent unwanted and/or unauthorized login to the mobile banking application, the end user may select (e.g., by way of settings screen 702-2) an option that requires entry of the authentication key prior to logging in to the mobile banking application. Additionally or alternatively, the authentication key may be used to authorize payment and/or transfer of funds to/from the personal banking account associated with the mobile banking application after the login to the mobile banking application.

In certain examples, management facility 102 may facilitate access to the one or more features of the mobile device by authorizing payment by way of a digital wallet feature of the mobile device. Through the digital wallet feature, the end user may provide payment by way of the mobile device at a point of sale terminal (e.g., a credit card and/or other payment information reader at a store checkout counter). To prevent unwanted and/or unauthorized use of the digital wallet feature, the end user may select (e.g., by way of settings screen 702-2) an option that requires entry of the authentication key prior to providing a payment by way of the digital wallet feature. For example, the end user may hold the mobile device up to the point of sale terminal and enter, in any suitable manner, a user input representative of an authentication key to authorize the payment by way of the digital wallet feature.

The exemplary features described above are provided for illustrative purposes only. It is understood that management facility 102 may use the authentication key to authenticate the end user to access any suitable feature that may be provided by way of the mobile device.

As shown in FIG. 8, settings screen 702-2 may include one or more options that allow the end user to select situations in which an authentication key may be utilized. For example, in FIG. 8, the end user may select options that allow use of the authentication key to unlock an incoming call lock screen and/or a native lock screen of the mobile device. In addition, the end user may indicate that the authentication key is required to authorize use of and/or access to a camera of the mobile device and/or one or more mobile applications (e.g., applications A through C) operating on the mobile device. In the example shown in FIG. 8, the end user may enter an "X" in the field adjacent to "Application A" in settings screen 702-2 to indicate that the authentication key is required to authorize access to "Application A" and/or access to some feature provided by way of "Application A."

Although the systems and methods described herein have been described primarily in the context of a two-dimensional touch input on a touch screen of a mobile device, it is understood that the same concepts may be applied in a three-dimensional context. For example, an end user of a proximity display device may define, in any suitable manner, a three-dimensional authentication key in a three-dimensional space associated with the proximity display device. Management facility 102 may then utilize vector calculations similar to those described herein to determine whether a subsequent authentication gesture within the three-dimensional space satisfies an end-user-defined authentication key requirement associated with the three-dimensional authentication key.

Figure 9:
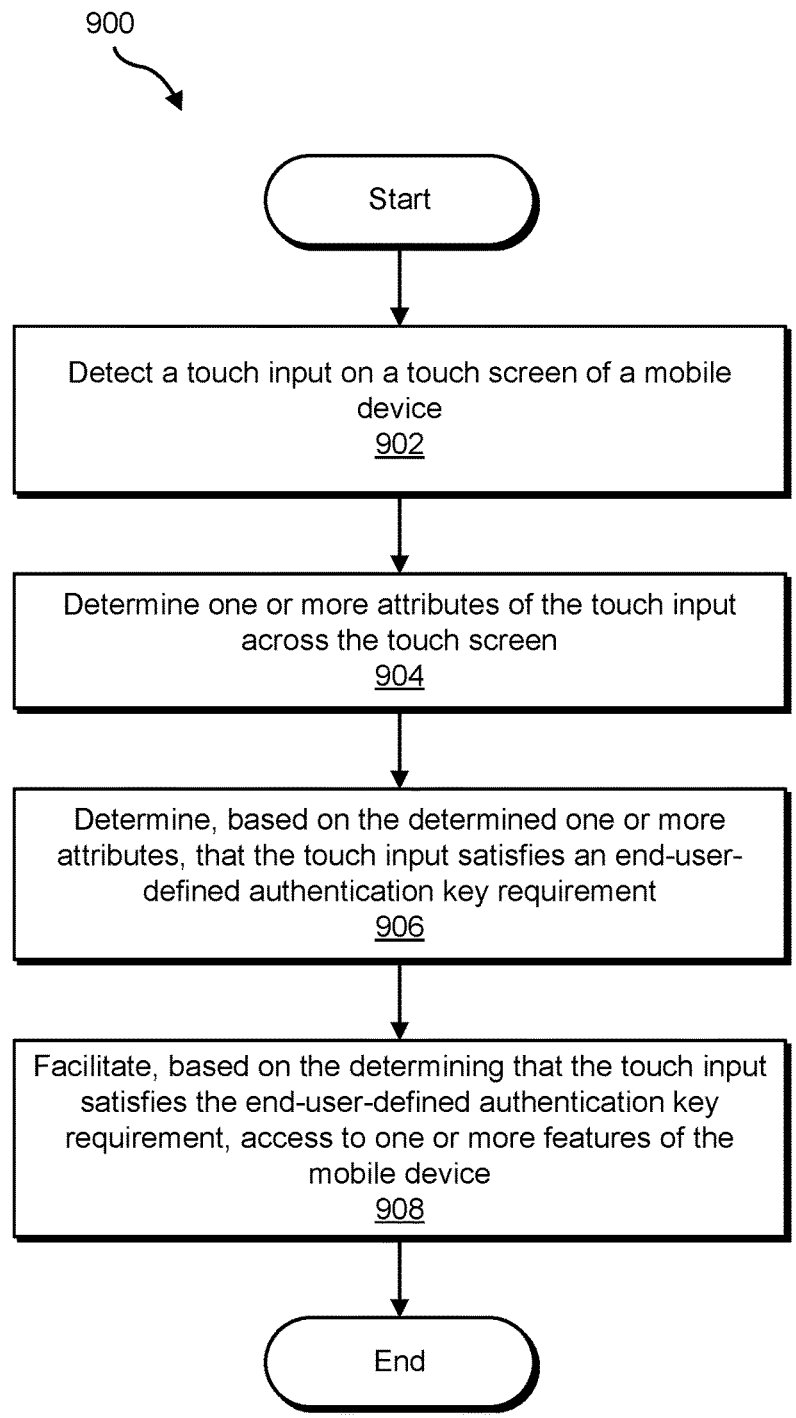
FIGS. 9-10 illustrate exemplary user authentication methods according to principles described herein.
Figure 10:
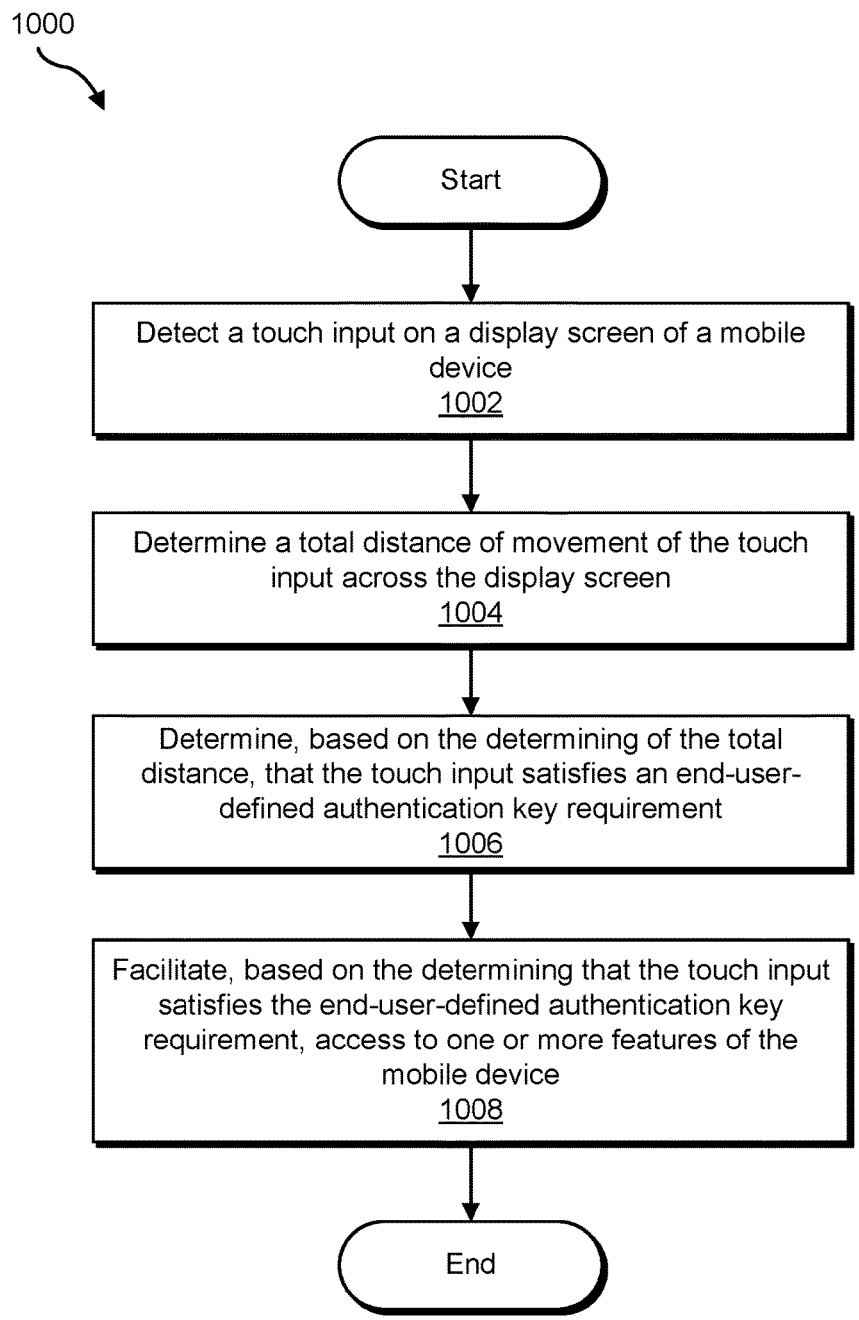

FIGS. 9-10 illustrate exemplary user authentication methods 900 and 1000 according to principles described herein. While FIGS. 9-10 illustrate exemplary operations according to certain embodiments, other embodiments may omit, add to, reorder, combine, and/or modify any of the operations shown in FIGS. 9-10. In certain embodiments, one or more of the operations shown in FIGS. 9-10 may be performed by system 100 and/or one or more components or implementations of system 100.

Turning to method 900 illustrated in FIG. 9, in operation 902, a system (e.g., system 100) may detect a touch input on a touch screen of a mobile device. As described herein, in certain examples, the touch screen may include a lock screen of the mobile device that displays a notification of an incoming voice call. In such examples, system 100 may detect a touch input while the lock screen displays a notification of the incoming voice call. Operation 902 may be performed in any of the ways described herein.

In operation 904, the system may determine one or more attributes of the touch input across the touch screen. Operation 904 may be performed in any of the ways described herein.

In operation 906, the system may determine, based on the determined one or more attributes, that the touch input satisfies an end-user-defined authentication key requirement. Operation 906 may be performed in any of the ways described herein.

In operation 908, the system may facilitate, based on the determining that the touch input satisfies the end-user-defined authentication key requirement, access to one or more features of the mobile device. Operation 1208 may be performed in any of the ways described herein.

In certain examples, the determined one or more attributes of the touch input may include a total distance of movement across the touch screen. In such examples, the system may, as part of operation 906, compare the total distance of movement to a distance requirement specified by the end-user-defined authentication key requirement. If the total distance of movement is equal to or within a predefined tolerance of the distance requirement, the system may determine that the touch input satisfies the end-user-defined authentication key requirement.

Turning to method 1000 illustrated in FIG. 10, in operation 1002, a system (e.g., system 100) may detect a touch input on a touch screen of a mobile device. Operation 1002 may be performed in any of the ways described herein.

In operation 1004, the system may determine a total distance of movement of the touch input across the touch screen. Operation 1004 may be performed in any of the ways described herein.

In operation 1006, the system may determine, based on the determining of the total distance, that the touch input satisfies an end-user-defined authentication key requirement. Operation 1006 may be performed in any of the ways described herein.

In operation 1008, the system may facilitate, based on the determining that the touch input satisfies the end-user-defined authentication key requirement, access to one or more features of the mobile device. Operation 1008 may be performed in any of the ways described herein.

In certain examples, the one or more features of the mobile device may include features associated with connecting to an incoming voice call. In such examples, the system may facilitate connecting to the incoming voice call in operation 1008, such as described herein.

While certain examples are described herein in reference to the use of touch inputs on a display screen of a mobile device to authenticate to the mobile device, principles described herein may be applied to other types of input that may be used to authenticate to a mobile device. To illustrate, instead of or in addition to touch input on the display screen of a mobile device being used to authenticate to the mobile device, movement of the mobile device may be used as user input to authenticate to the mobile device in accordance with the principles described herein.

For example, system 100 may provide, for display on a display screen of a mobile device, a settings screen that prompts an end user of the mobile device to define an authentication key. While the settings screen is displayed, the end user of the mobile device may move the mobile device in a particular motion to define the authentication key, such as by making a gesture with a hand while holding the mobile device in the hand. System 100 may detect the motion of the mobile device as an authentication-key-defining movement of the mobile device. System 100 may determine one or more attributes of the authentication-key-defining movement of the mobile device and define the authentication key based on the authentication-key-defining movement of the mobile device.

The attributes of the authentication-key-defining movement of the mobile device may represent any characteristics of the movement of the mobile device and may include any of the attributes described herein in reference to touch input. For example, the attributes may include one or more distances, directions, speeds, and/or accelerations of the movement of the mobile device. In certain examples, the attributes of the movement of the mobile device may be represented as a set of one or more vectors having attributes such as directions of vectors, magnitudes of vectors (e.g., a total magnitude of vectors representing a total distance of movement), and angles between consecutive vectors, such as described herein.

In certain examples, after the authentication-key-defining movement of the mobile device has been detected and used by system 100 to define an authentication key, system 100 may provide an additional settings screen that includes one or more options to modify the authentication key. The options may allow the end user of the mobile device to modify any of the attributes of the authentication key and/or to define a tolerance threshold for any of the attributes of the authentication key, such as described herein. For example, the settings screen may include an option to modify a distance threshold specified by the authentication key, an option to modify a number of vectors associated with the authentication key, and an option to define an end-user-defined tolerance of the distance threshold specified by the authentication key.

Once the authentication key has been defined, system 100 may use the authentication key to authenticate an end user to a mobile device. For example, system 100 may detect a movement of the mobile device, determine that that movement of the mobile device satisfies an authentication key requirement of the end-user-defined authentication key, and facilitate, based on the determination that the movement of the mobile device satisfies the end-user-defined authentication key requirement, access to one or more features of the mobile device, such as described herein.

To illustrate one example, while a lock screen of a mobile device displays a notification of an incoming voice call, system 100 may detect a movement of the mobile device. System 100 may determine that the movement of the mobile device satisfies an end-user-defined authentication key requirement and, in response, may facilitate a pick-up of the incoming voice call. In certain examples, the determination that the movement of the mobile device satisfies an end-user-defined authentication key requirement may include system 100 determining a total distance of the movement of the mobile device and determining that the total distance of the movement of the mobile device satisfies the end-user-defined authentication key requirement. In certain examples, the determination that the movement of the mobile device satisfies an end-user-defined authentication key requirement may include system 100 identifying a set of vectors representative of the movement of the mobile device and determining that attributes of the set of vectors representative of the movement of the mobile device satisfy the end-user-defined authentication key requirement.

In such motion-based authentication systems and methods, a mobile device may include one or more sensors that may be employed by system 100 to detect movement of the mobile device and identify attributes of the movement of the mobile device. For example, the mobile device may include one or more accelerometers, gyroscopes, and/or barometers configured for use in sensing motion of the mobile device.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 11:
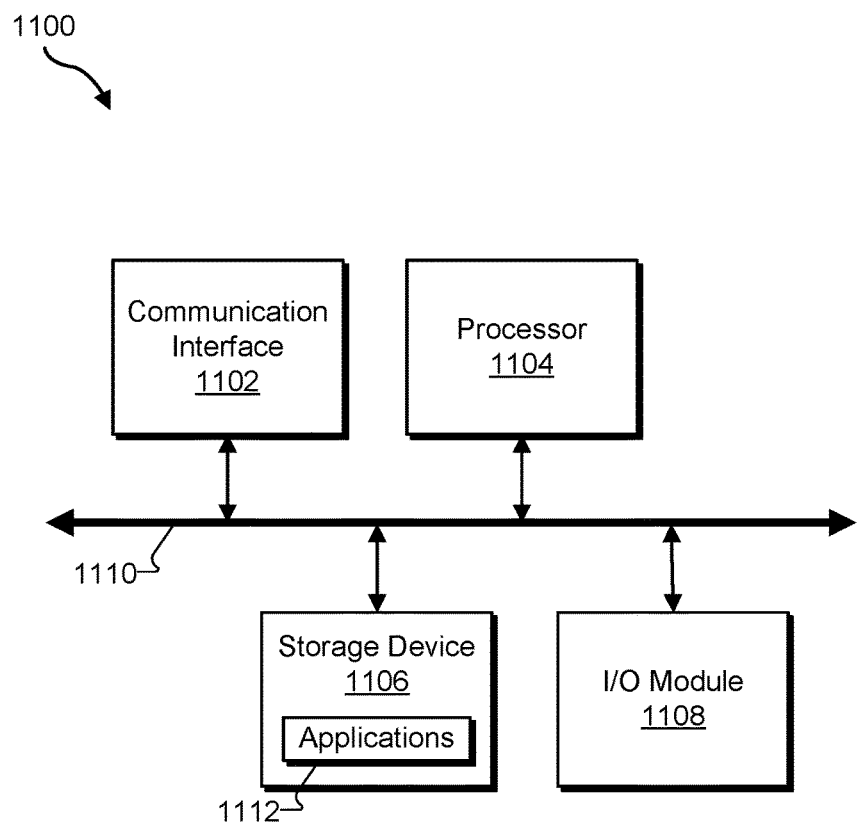
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output (I/O) module 1108 communicatively connected via a communication infrastructure 1110. While an exemplary computing device 1100 is shown in FIG. 11, the components illustrated in FIG. 11 are not intended to be limiting. Additional or alternative components and/or configurations of components may be used in other embodiments. For example, in addition or alternative to being communicatively connected by way of communication infrastructure 1110, one or more components of computing device 1100 may be communicatively connected by way of one or more other suitable interfaces. For instance, communication interface 1102, storage device 1106, I/O module 1108, and/or any other components of computing device 1100 may be communicatively coupled directly to processor 1104 via one or more interfaces (e.g., discrete interfaces). Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, and any other suitable interface. In at least one embodiment, communication interface 1102 may provide a direct connection between system 100 and one or more of provisioning systems via a direct link to a network, such as the Internet. Communication interface 1102 may additionally or alternatively provide such a connection through, for example, a local area network (such as an Ethernet network), a personal area network, a telephone or cable network, a satellite data connection, a dedicated URL, or any other suitable connection. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory (RAM), dynamic RAM (DRAM), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications described herein) configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a touch screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1100. For example, one or more applications 1112 residing within storage device

1106 may be configured to direct processor 1104 to perform one or more processes or functions associated with system 100 or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

To the extent the aforementioned embodiments may modify media programs and/or provide alternative ways for users to access and/or consume media programs, it should be understood that such operations shall be used in accordance with all applicable laws and/or agreements concerning protection of media programs and the rights of owners and/or distributors of media programs. One or more of the operations described herein may be subject to the consent and/or agreement of one or more entities, such as owners and/or distributors of media programs.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a user authentication system, a touch input on a lock screen of a mobile device while the lock screen displays a notification of an incoming voice call;
   determining, by the user authentication system, a movement of the touch input across the lock screen;
   determining, by the user authentication system based on the determining of the movement, that the touch input satisfies an end-user-defined authentication key requirement that includes an end-user-defined setting specifying that a direction of a vector of the touch input across the lock screen and an angle tolerance requirement of a selected number of degrees of the vector will not be considered as part of the end-user-defined authentication key requirement; and
   facilitating, by the user authentication system based on the determining that the touch input satisfies the end-user-defined authentication key requirement, a pick-up of the incoming voice call, wherein, based on the end-user-defined setting, the determining that the touch input satisfies the end-user-defined authentication key requirement is performed irrespective of a direction in which the touch input is directed across the lock screen.

2. The method of claim 1, wherein:
   the end-user-defined authentication key requirement comprises an end-user-defined distance requirement; and
   the determining that the touch input satisfies the end-user-defined authentication key requirement includes determining that a distance of movement of the touch input across the lock screen satisfies the end-user-defined distance requirement.

3. The method of claim 2, wherein:
   the end-user-defined authentication key requirement comprises an end-user-defined tolerance for the end-user-defined distance requirement; and
   the determining that the distance of movement of the touch input across the lock screen satisfies the end-user-defined distance requirement includes determining that the distance of movement of the touch input across the lock screen satisfies the end-user-defined distance requirement within the end-user-defined tolerance for the end-user-defined distance requirement.

4. The method of claim 1, wherein:
   the end-user-defined authentication key requirement comprises an end-user-defined vector number requirement; and
   the determining that the touch input satisfies the end-user-defined authentication key requirement includes determining that a number of vectors representative of the touch input across the lock screen satisfies the end-user-defined vector number requirement.

5. The method of claim 1, further comprising providing, by the user authentication system for display on the lock screen of the mobile device, a distance indicator that indicates, in real time, a current distance of movement of the touch input as the touch input moves across the lock screen.

6. The method of claim 1, further comprising:
   providing, by the user authentication system for display on a touch screen of the mobile device, a settings screen that prompts an end user of the mobile device to define an authentication key;
   detecting, by the user authentication system, an authentication-key-defining touch input across the settings screen;
   determining, by the user authentication system based on the authentication-key-defining touch input, one or more attributes of the authentication-key-defining touch input across the settings screen; and
   defining, by the user authentication system based on the one or more attributes of the authentication-key-defining touch input, the authentication key.

7. The method of claim 6, further comprising:
   providing, by the user authentication system for display on the touch screen of the mobile device, an additional settings screen that includes an option to define the end-user-defined setting to specify that the direction of the vector representative of the touch input across the lock screen will not be considered as part of the end-user-defined authentication key requirement.

8. The method of claim 6, further comprising:
   providing, by the user authentication system for display on the touch screen of the mobile device, an additional settings screen that includes one or more options to modify the authentication key, the one or more options comprising at least one of an option to modify a distance threshold specified by the authentication key and an option to define an end-user-defined tolerance of the distance threshold specified by the authentication key.

9. The method of claim 1, embodied as computer-executable instructions on at least one non-transitory computer-readable medium.

10. A method comprising:
   detecting, by a user authentication system while a lock screen is displayed on a touch screen of a mobile device, a touch input across the lock screen of the mobile device;
   determining, by the user authentication system, a movement of the touch input across the lock screen;
   determining, by the user authentication system based on the determining of the movement, that the touch input satisfies an end-user-defined authentication key requirement that includes an end-user-defined setting specifying that a direction of the touch input across the lock screen and an angle tolerance requirement of a selected number of degrees of the vector will not be considered as part of the end-user-defined authentication key requirement; and
   facilitating, by the user authentication system based on the determining that the touch input satisfies the end-user-defined authentication key requirement, access to a feature of the mobile device, wherein, based on the end-user-defined setting, the determining that the touch input satisfies the end-user-defined authentication key requirement is performed irrespective of a direction in which the touch input is directed across the lock screen.

11. The method of claim 10, wherein:
   the detecting of the touch input across the lock screen of the mobile device is performed while the lock screen displays a notification of an incoming voice call; and
   the facilitating of the access to the feature of the mobile device comprises facilitating a pick-up of the incoming voice call.

12. The method of claim 10, embodied as computer-executable instructions on at least one non-transitory computer-readable medium.

13. A system comprising:
   at least one physical computing device that:
   detects a touch input on a lock screen of a mobile device while the lock screen displays a notification of an incoming voice call;
   determines a movement of the touch input across the lock screen;
   determines based on the determination of the movement that the touch input satisfies an end-user-defined authentication key requirement that includes an end-user-defined setting specifying that a direction of a vector representative of the touch input across the lock screen and an angle tolerance requirement of a selected number of degrees of the vector will not be considered as part of the end-user-defined authentication key requirement; and
   facilitates, after the at least one physical computing device determines that the touch input satisfies the end-user-defined authentication key requirement, a pick-up of the incoming voice call, wherein, based on the end-user-defined setting, the at least one physical computing device determines that the touch input satisfies the end-user-defined authentication key requirement irrespective of a direction in which the touch input is directed across the lock screen.

14. The system of claim 13, wherein:
   the end-user-defined authentication key requirement comprises an end-user-defined distance requirement; and
   the determining that the touch input satisfies the end-user-defined authentication key requirement includes determining that a distance of movement of the touch input across the lock screen satisfies the end-user-defined distance requirement.

15. The system of claim 14, wherein:
   the end-user-defined authentication key requirement comprises an end-user-defined tolerance for the end-user-defined distance requirement; and
   the determining that the distance of movement of the touch input across the lock screen satisfies the end-user-defined distance requirement includes determining that the distance of movement of the touch input across the lock screen satisfies the end-user-defined distance requirement within the end-user-defined tolerance for the end-user-defined distance requirement.

16. The system of claim 13, wherein:
   the end-user-defined authentication key requirement comprises an end-user-defined vector number requirement; and
   the determining that the touch input satisfies the end-user-defined authentication key requirement includes determining that a number of vectors representative of the touch input across the lock screen satisfies the end-user-defined vector number requirement.

17. The system of claim 13, wherein the at least one physical computing device provides, for display on the lock screen of the mobile device, a distance indicator that indicates, in real time, a current distance of movement of the touch input as the touch input moves across the lock screen.

18. The system of claim 13, wherein the at least one physical computing device:
   provides, for display on a touch screen of the mobile device, a settings screen that prompts an end user of the mobile device to define an authentication key;
   detects an authentication-key-defining touch input across the settings screen;
   determines, based on the authentication-key-defining touch input, one or more attributes of the authentication-key-defining touch input across the settings screen; and
   defines, based on the one or more attributes of the authentication-key-defining touch input, the authentication key.

19. The system of claim 18, wherein the at least one physical computing device provides, for display on the touch screen of the mobile device, an additional settings screen that includes an option to define the end-user-defined setting to specify that the direction of the vector representative of the touch input across the lock screen will not be considered as part of the end-user-defined authentication key requirement.

20. The system of claim 18, wherein the at least one physical computing device provides, for display on the touch screen of the mobile device, an additional settings screen that includes one or more options to modify the authentication key, the one or more options comprising at least one of an option to modify a distance threshold specified by the authentication key and an option to define an end-user-defined tolerance of the distance threshold specified by the authentication key.

* * * * *